(12) United States Patent
Ikezawa et al.

(10) Patent No.: US 12,462,582 B2
(45) Date of Patent: Nov. 4, 2025

(54) DRIVING SUPPORT APPARATUS

(71) Applicant: TOYOTA JIDOSHA KABUSHIKI KAISHA, Toyota (JP)

(72) Inventors: Yuta Ikezawa, Toyota (JP); Kohei Tochigi, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 306 days.

(21) Appl. No.: 18/467,398

(22) Filed: Sep. 14, 2023

(65) Prior Publication Data

US 2024/0127598 A1 Apr. 18, 2024

(30) Foreign Application Priority Data

Oct. 14, 2022 (JP) .................... 2022-165238

(51) Int. Cl.
  *G06V 20/58* (2022.01)
  *B60W 10/18* (2012.01)
  *G06T 7/20* (2017.01)
  *G06T 7/50* (2017.01)

(52) U.S. Cl.
  CPC ............ *G06V 20/58* (2022.01); *B60W 10/18* (2013.01); *G06T 7/20* (2013.01); *G06T 7/50* (2017.01); *G06T 2207/10028* (2013.01)

(58) Field of Classification Search
  None
  See application file for complete search history.

(56) References Cited

U.S. PATENT DOCUMENTS

| | | | |
|---|---|---|---|
| 8,355,851 B2 | 1/2013 | Inoue et al. | |
| 8,370,040 B2 | 2/2013 | Inoue et al. | |
| 8,417,430 B2 | 4/2013 | Saeki | |
| 8,548,709 B2 | 10/2013 | Morita | |
| 8,768,597 B2 | 7/2014 | Kagawa | |
| 9,174,643 B2 | 11/2015 | Aso | |
| 10,017,178 B2 | 7/2018 | Morimoto et al. | |
| 10,118,617 B2 | 11/2018 | Urano et al. | |
| 10,486,698 B2 | 11/2019 | Masui et al. | |
| 2019/0295419 A1 | 9/2019 | Tosa et al. | |
| 2021/0171032 A1 | 6/2021 | Ito et al. | |

FOREIGN PATENT DOCUMENTS

| | | | | |
|---|---|---|---|---|
| CN | 108764373 B | * 11/2021 | ............ | G06F 18/25 |
| JP | 2002032899 A | * 1/2002 | | |
| JP | 2007317128 A | * 12/2007 | | |
| JP | 2021-088289 A | 6/2021 | | |

* cited by examiner

*Primary Examiner* — Bernard Krasnic
(74) *Attorney, Agent, or Firm* — Sughrue Mion, PLLC (57) ABSTRACT

A driving support apparatus comprises a sensor configured to acquire sensor information that is used to acquire a distance between a vehicle and an object, and a controller configured to execute a driving support control using a first distance, which is acquired by applying a first recognition method to the sensor information, representing a distance between the vehicle and a target object as a control distance. The first recognition method has a characteristic that a recognition reliability of the target object increases as an acquisition time of the first distance increases. The controller is configured to use an extrapolation distance representing the vehicle and the target object as the control distance, when the first distance can no longer be acquired and the acquisition time is equal to or longer than a predetermined threshold time.

4 Claims, 5 Drawing Sheets

DRIVING SUPPORT APPARATUS

TECHNICAL FIELD

The present disclosure relates to a driving support apparatus that executes a driving support control based on a distance between a vehicle and a target object.

BACKGROUND

Conventionally, a driving support apparatus that executes a driving support control based on a distance between a vehicle and a target object has been known. For example, a driving support apparatus described in Patent Document 1 (hereinafter, referred to as a "conventional apparatus") specifies a target object based on a detection result of an external sensor (for example, a camera), and determines whether or not a deceleration support start condition is satisfied based on a distance (an object distance) between the vehicle and the target object. When the deceleration support start condition is satisfied, the conventional apparatus executes a deceleration support control as the driving support control. Specifically, the conventional apparatus calculates a detection reliability indicating an accuracy of the target object so as to increase a support amount of the deceleration support control as the detection reliability increases.

Patent Document 1: Japanese Patent Application Laid-Open No. 2021-88289

SUMMARY

In the conventional apparatus, when the detection reliability is changed from a high state to a low state, a possibility that the deceleration support control is performed on another object that is not the target object becomes high. The deceleration support control performed on another object that is not the target object is likely to annoy the driver.

The present disclosure has been made to address the above-described problem. That is, an object of the present invention is to provide a driving support apparatus capable of reducing a possibility that the driving support control annoys the driver by reducing a possibility that driving support control is performed on an object that is not a target object.

The driving support apparatus of the present disclosure (hereinafter, referred to as "the present apparatus") comprises:
 a sensor (22) configured to acquire sensor information that is used to acquire a distance between a vehicle and an object; and
 a controller (20) configured to execute a driving support control using a first distance representing a distance between the vehicle and a predetermined target object as a control distance, the first distance being acquired by applying a first recognition method to the sensor information,
 wherein, the first recognition method has a characteristic that a recognition reliability of the target object increases as an acquisition time of the first distance increases,
 wherein,
 the controller is further configured to use an extrapolation distance representing an object distance between the vehicle and the target object as the control distance, when the first distance can no longer be acquired (step 425: No) and the acquisition time is equal to or longer than a predetermined threshold time (step 455: Yes), the extrapolation distance being estimated based on an acquired distance representing the first distance which was acquired and a speed of the vehicle.

The first recognition method has the characteristic that the recognition reliability of the target object increases as the acquisition time of the first distance increases. According to the present apparatus, if the acquisition time is equal to or longer than the threshold time when the first distance cannot be acquired, the extrapolation distance is used as the control distance. That is, the extrapolation distance is used as the control distance when the recognition reliability of the target object is equal to or higher than a predetermined reliability (that is, when a possibility of erroneously recognizing an object that is not the target object as the target object is low). Therefore, since the extrapolation distance of the object that is highly likely to be the target object is used as the control distance, the possibility that the driving support control is performed on the object that is not the target object can be reduced, and the possibility that the driving support control annoys the driver can be reduced. If the extrapolation distance is used as the control distance when the acquisition time is less than the threshold time, there is a high possibility that the extrapolation distance of the object that is not the target object continues to be used as the control distance, and there is a high possibility that the driving support control is executed for the object that is not the target object.

DETAILED DESCRIPTION

Figure 1:
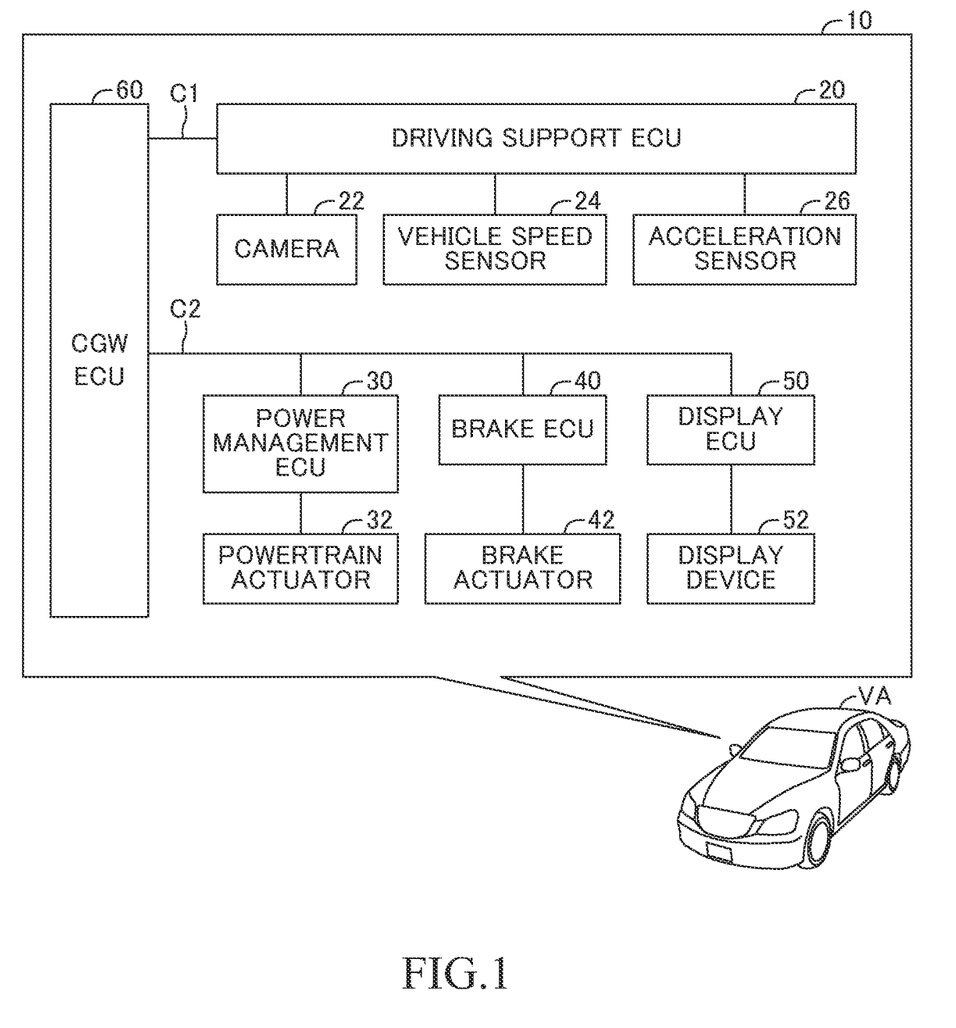
FIG. 1 is a schematic system configuration diagram of a driving support apparatus according to an embodiment of the present disclosure.

A driving support apparatus (a support apparatus 10) according to the embodiment of the present disclosure is applied to a vehicle VA and includes components illustrated in FIG. 1.

A driving support ECU20 is an ECU that executes a driving support control, and is hereinafter referred to as an "ECU20".

In the present specification, the "ECU" is an electronic control unit including a microcomputer as a main part. The ECU is referred to as a controller. The microcomputer includes a CPU (a processor), a ROM, a RAM, an interface, and the like. Some or all of the ECU20 and the plurality of ECUs described below may be integrated into one ECU.

A camera 22 acquires image data by capturing an image in front of the vehicle VA so as to transmit the image data to ECU20, every time a predetermined time elapses. The image data may be referred to as "sensor information".

A vehicle speed sensor 24 measures a speed of the vehicle VA (a vehicle speed Vs). An acceleration sensor 26 measures an acceleration G of the vehicle VA. The ECU20 receives the measured values from these sensors 24 and 26.

A power management ECU30 is connected to a powertrain actuator 32. The power management ECU30 controls the powertrain actuator 32. The powertrain actuator 32 changes a driving force generated by a driving device (for example, an internal combustion engine and/or an electric motor) of the vehicle VA.

A brake ECU40 is connected to a brake actuator 42 and controls the brake actuator 42. The brake actuator 42 controls a braking force applied to the vehicle VA.

A display ECU50 is connected to a display device 52, and displays an alert screen (referred to a fourth modification described later) on the display device 52.

A CGW (control gateway) ECU60 controls transmission/reception of data between the plurality of ECUs via a first communication line C1 and a second communication line C2.

(Operation)

Figure 2:
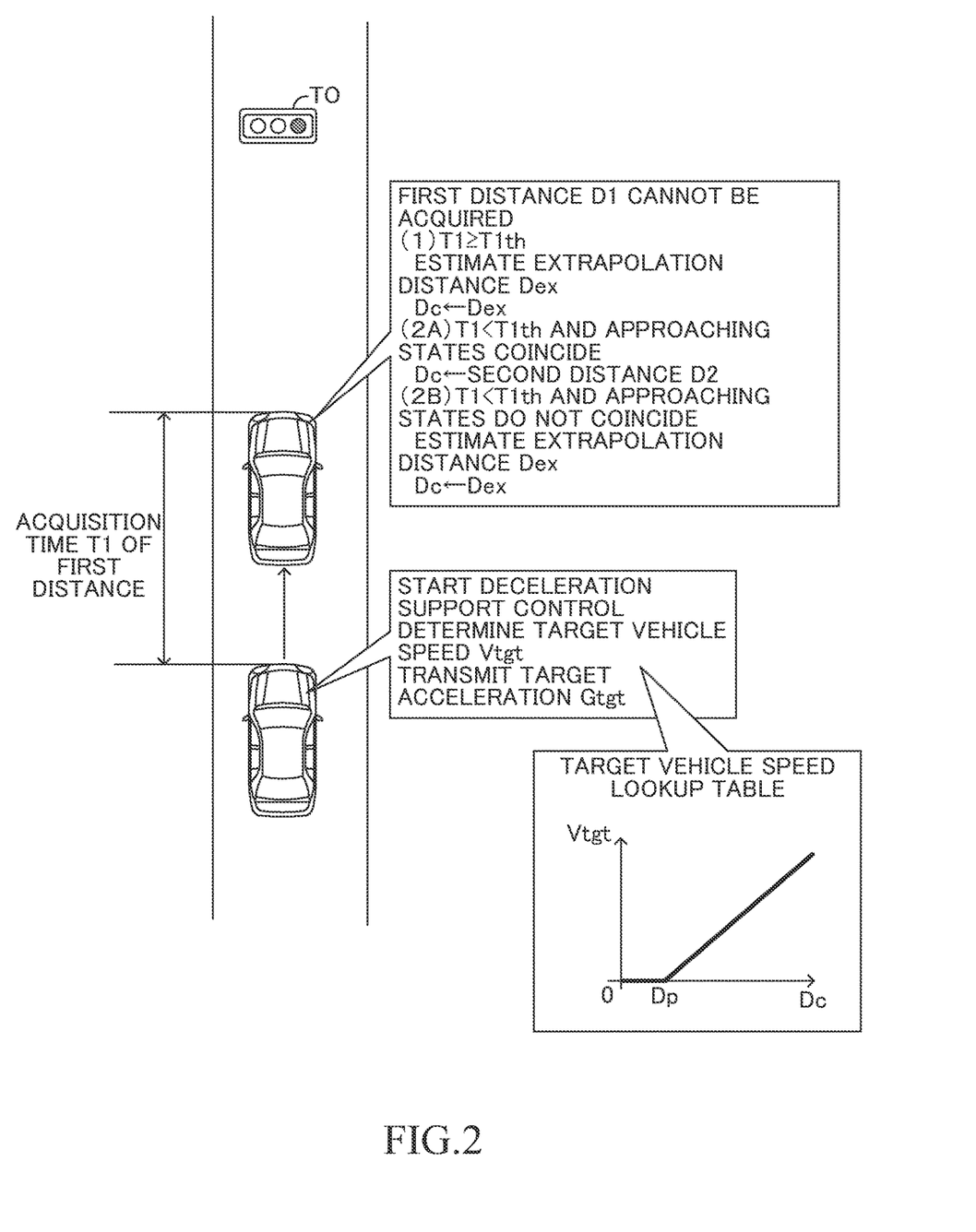
FIG. 2 is a diagram for explaining an operation of the driving support apparatus.

Referring to FIG. 2, an operation of the ECU20 of the support apparatus 10 will be described.

The ECU20 executes the deceleration support control as the driving support control. The deceleration support control is a control for decelerating the vehicle VA in order to stop the vehicle VA in front of a predetermined range Dp of the target object TO. This deceleration support control is a kind of automatic driving. For example, the target object TO is a traffic light (a stationary object) displaying a stop signal (i.e., displaying red or yellow).

When the ECU20 determines that a start condition is satisfied based on the image data acquired from the camera 22, the ECU20 starts the deceleration support control. The start condition is satisfied when the target object TO is detected and a preceding vehicle is not detected. The preceding vehicle is a vehicle that travels in the same lane as the vehicle VA and is located within a predetermined distance in front of the vehicle VA.

In the deceleration support control, the ECU20 acquires a target vehicle speed Vtgt by applying "a control distance Dc representing a distance between the vehicle VA and the target object TO" to a target vehicle speed lookup table MapV(Dc). The target vehicle speed lookup table MapV (Dc) is stored in the ROM of the ECU20. When the vehicle speed Vs is larger than the target vehicle speed Vtgt, the ECU20 acquires a target acceleration Gtgt based on the following equation (1), and transmits the target acceleration Gtgt to the power management ECU30 and the brake ECU40.

$$Gtgt=Ga(Vtgt-Vs) \qquad \text{Equation (1)}$$

The "Ga" in the equation (1) is a predetermined gain.

The ECU20 recognizes the target object TO by applying (using) a first recognition method and a second recognition method to (for) the image data, and acquires a first distance D1 and a second distance D2 to the target object TO, respectively. A distance accuracy of the second recognition method is lower than the distance accuracy of the first recognition method. For example, in the first recognition method, the ECU20 extracts feature points of the target object TO from the image data captured at different points, and acquires the first distance D1 to the target object TO based on the corresponding feature points in the image data. An example of the first recognition method is SfM (Structure from Motion). When an acquisition time of the first distance D1 is short, the number of feature points is small. The acquisition time represents a time during which the first distance D1 is continuously acquired. Therefore, an erroneous recognition possibility when the acquisition time is short is higher than the recognition possibility when the acquisition time is long. The erroneous recognition possibility is a possibility that the ECU20 erroneously recognizes an object that is not the target object as the target object. In other words, the first recognition method has a characteristic that a recognition reliability of the target object increases as the acquisition time of the first distance D1 increases.

In the second recognition method, the ECU20 extracts the target object TO by applying pattern matching to the image data, and acquires the second distance D2 to the target object TO based on a size of the target object TO in the image data.

When the ECU20 acquires the first distance D1, the ECU20 uses the first distance D1 as the control distance Dc. When the ECU20 can no longer acquire the first distance D1, the ECU20 determines whether or not the acquisition time T1 representing the time during which the first distance D1 was continuously acquired is equal to or greater than a predetermined threshold time T1$th$. The threshold time T1$th$ is set to a value such that the recognition reliability of the target object in the first recognition method is equal to or greater than a predetermined value.

(1) When the acquisition time T1 is equal to or greater than the threshold time T1$th$, the ECU20 executes the following processes.

The ECU20 estimates an object distance representing a distance to the target object TO based on the first distance D1 already acquired (sometimes referred to as an "acquired distance") and the vehicle speed Vs. The object distance estimated in this way may be referred to as an "extrapolation distance Dex". Specifically, the ECU20 acquires, as the extrapolation distance Dex, a distance acquired by subtracting a "travel distance Ds of the vehicle VA" from the last acquired first distance D1. The ECU20 acquires the travel distance Ds by multiplying a time elapsed from a time point at which the first distance D1 was last acquired by the vehicle speed Vs. The ECU20 uses the extrapolation distance Dex as the control distance Dc.

(2) When the acquisition time T1 is less than the threshold time T1$th$, the ECU20 executes the following processes.

The ECU20 determines whether or not a first approaching state and a second approaching state coincide with each other.

The ECU20 determines, based on a traveling direction of the vehicle VA, the first approaching state representing whether the target object TO recognized using the second recognition method is approaching the vehicle VA or is going away from the vehicle VA. It should be noted that the ECU20 specifies the traveling direction of the vehicle VA based on a shift position detected by a shift position sensor (not shown) and a steering angle of the vehicle VA detected by a steering angle sensor (not shown). The ECU20 determines, based on the second distance D2, the second approaching state representing whether the target object TO is approaching to the vehicle VA or is going away from the vehicle VA.

(2A) When the first approaching state and the second approaching state coincides with each other, the ECU20 executes the following process.

The ECU20 uses the second distance D2 as the control distance Dc.

(2B) When the first approaching state and the second approaching state do not coincide with each other, the ECU20 executes the following process.

The ECU20 uses the extrapolation distance Dex as the control distance Dc.

In the case of the above (1), the extrapolation distance Dex is estimated when the recognition reliability of the target object TO in the first recognition method is equal to or greater than the predetermined value, and the extrapolation distance Dex is used as the control distance Dc. It is possible to reduce a possibility that the extrapolation distance Dex of the object that is not the target object is continuously estimated. Therefore, it is possible to reduce a possibility that the extrapolation distance Dex is used as the control distance Dc. As a result, it is possible to reduce a possibility that the deceleration support control is continuously executed for the object that is not the target object.

In the case of the above (2A), since the first approaching state and the second approaching state coincide with each other, the distance accuracy of the second distance D2 is relatively high. Therefore, the second distance D2 is used as the control distance Dc. In the case of the above (2B), since the first approaching state and the second approaching state do not coincide with each other, the distance accuracy of the second distance D2 is relatively low. In this case, the extrapolation distance Dex estimated based on the first distance D1 is used as the control distance Dc.

Figure 3:
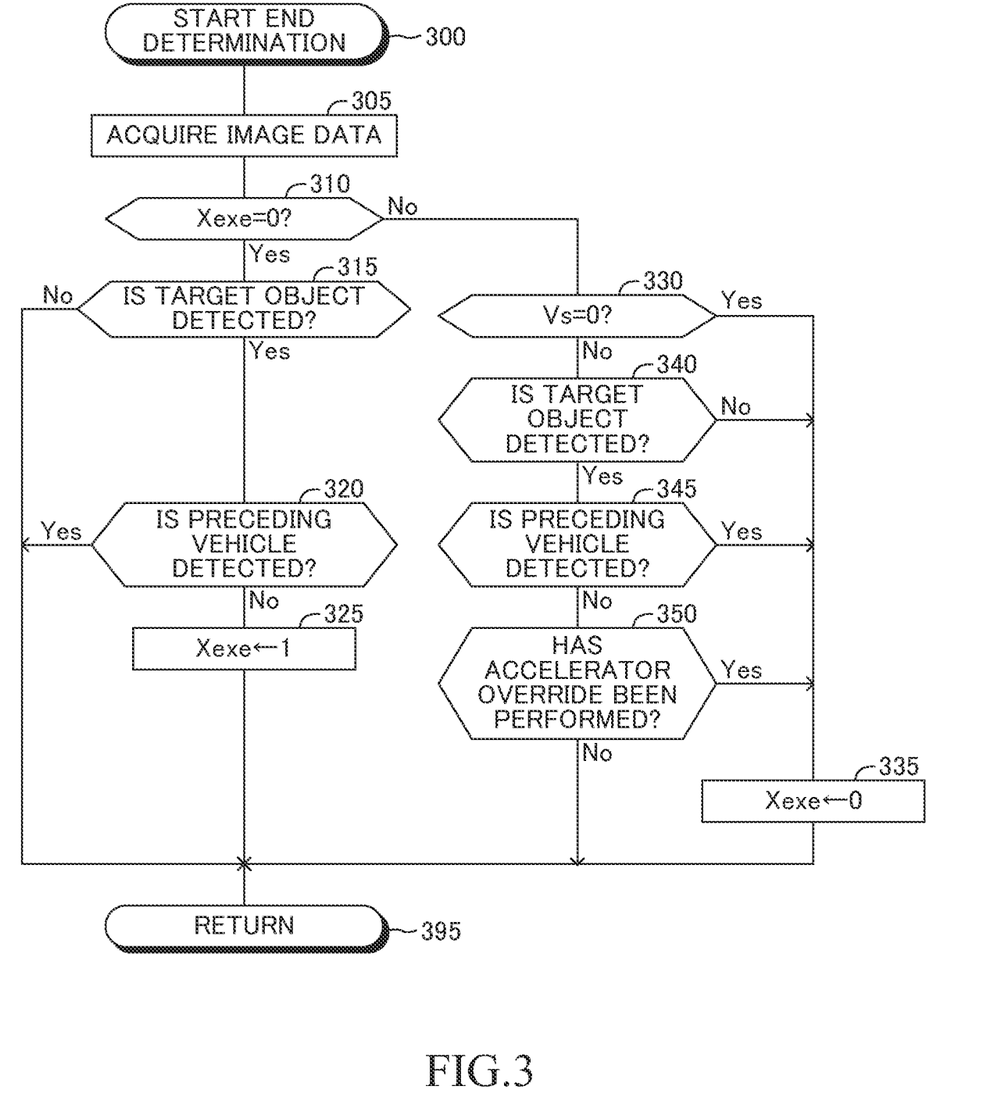
FIG. 3 is a flowchart of a program executed by a CPU of a driving support ECU.
Figure 4:
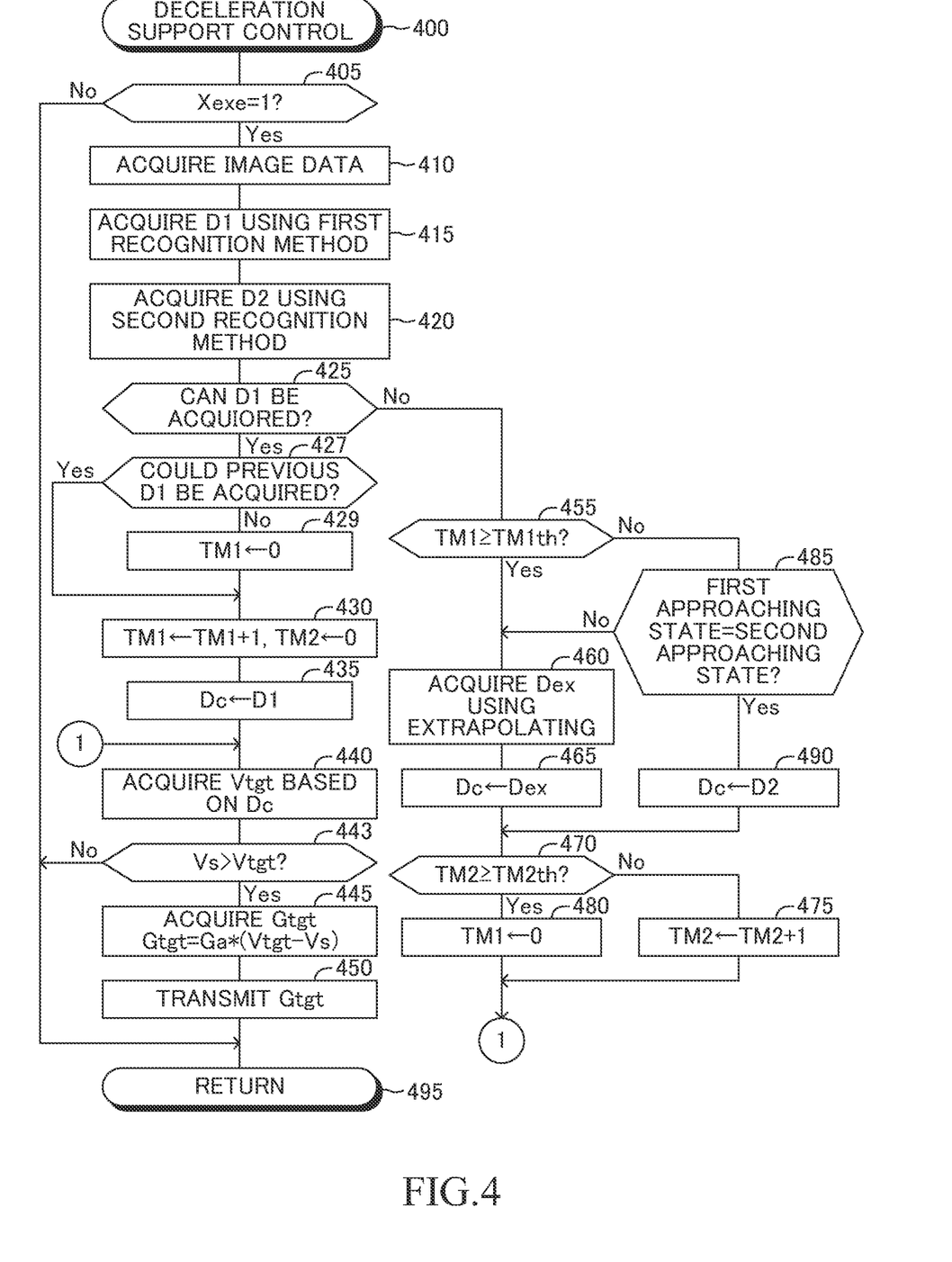
FIG. 4 is a flowchart of a program executed by the CPU of the driving support ECU.

The CPU of ECU20 executes routines illustrated by flowcharts in FIGS. 3 and 4 every time a predetermined time elapses.

<Start End Determination>

Accordingly, when an appropriate time point has arrived, the CPU starts processing from step 300 of FIG. 3 and executes step 305 and step 310.

Step 305: The CPU acquires the image data from the camera 22.

Step 310: The CPU determines whether or not an execution flag Xexe is "0".

The execution flag Xexe is set to "1" when the deceleration support control starts, and is set to "0" when the deceleration support control ends. The execution flag Xexe is also set to "0" in an initialization routine. The initialization routine is a routine executed by the CPU when an ignition-key switch (not shown) of the vehicle VA is changed from an off-position to an on-position.

When the execution flag Xexe is "0", a process proceeds to step 315. In step 315, the CPU determines whether or not the target object TO is detected from the image data. In one embodiment, the CPU detects the target object TO using the pattern matching.

When the target object TO is not detected from the image data, the process proceeds to step 395 so that the CPU terminates the present routine tentatively. When the target object TO is detected from the image data, the process CPU proceeds to step 320. In step 320, the CPU determines whether or not the preceding vehicle is detected based on the image data. In one embodiment, the CPU detects the preceding vehicle using the pattern matching.

When the preceding vehicle is detected, the process proceeds to step 395 so that the CPU terminates the present routine tentatively. When the preceding vehicle is not detected, the CPU sets the execution flag Xexe to "1" in step 325. Thereafter, the process proceeds to step 395 so that the CPU terminates the present routine tentatively.

When the execution flag Xexe is "1" in step 310, the CPU determines whether or not the vehicle speed Vs is "0 km/h" in step 330 (i.e., whether the vehicle VA has stopped).

When the vehicle speed Vs is "0 km/h", the CPU sets the execution flag Xexe to "0" in step 335. Thereafter, the process proceeds to step 395 so that the CPU terminates the present routine tentatively. When the vehicle speed Vs is not "0 km/h", the CPU determines whether or not the target object TO is detected from the image data in step 340.

When the target object TO is not detected, the CPU sets the execution flag Xexe to "0" in step 335. Thereafter, the process proceeds to step 395 so that the CPU terminates the present routine tentatively. When the target object TO is detected, the CPU determines whether or not the preceding vehicle is detected in step 345.

When the preceding vehicle is detected, the CPU sets the execution flag Xexe to "0" in step 335. Thereafter, the process proceeds to step 395 so that the CPU terminates the present routine tentatively. When the preceding vehicle is not detected, the CPU determines whether or not an accelerator override has been performed in step 350. The CPU determines that the accelerator override has been performed when an operating amount of an accelerator pedal (not shown) becomes equal to or greater than a threshold amount.

When the accelerator override has been performed, the CPU sets the execution flag Xexe to "0" in step 335. Thereafter, the process proceeds to step 395 so that the CPU terminates the present routine tentatively. When the accelerator override has not been performed, the process proceeds to step 395 so that the CPU terminates the present routine tentatively.

<Deceleration Support Control>

Accordingly, when an appropriate time point has arrived, the CPU starts a process from step 400 of FIG. 4 and determines whether or not the execution flag Xexe is "1" in step 405.

When the execution flag Xexe is "0", the process proceeds to step 495 so that the CPU terminates the present routine tentatively. When the execution flag Xexe is "1", the CPU executes steps 410 to 425.

Step 410: The CPU acquires the image data from the camera 22.

Step 415: The CPU acquires the first distance D1 by applying the first recognition method to the image data.

Step 420: The CPU acquires the second distance D2 by applying the second recognition method to the image data.

Step 425: The CPU determines whether the first distance D1 can be acquired in step 415. For example, the CPU determines that the first distance D1 cannot be acquired when the number of feature points of the target object TO is equal to or smaller than the threshold value.

When the first distance D1 can be acquired, in step 427, the CPU determines whether or not the first distance D1 could be acquired when the previous routine was executed.

When the previous first distance D1 could not be acquired, the CPU sets a first timer TM1 to "0" in step 429 and executes steps 430 to 443. On the other hand, when the previous first distance D1 can be acquired, the CPU executes steps 430 to 443.

Step 430: The CPU adds "1" to a value of the first timer TM1 and set a value of the second timer TM2 to "0".

The first timer TM1 is a timer for counting the acquisition time T1. The second timer TM2 is a timer for counting an elapsed time from a time point at which the first distance D1 can no longer be acquired.

Step 435: The CPU sets the control distance Dc to the first distance D1.

Step 440: The CPU acquires the target vehicle speed Vtgt by applying the control distance Dc to the target vehicle speed lookup table MapV(Dc).

The target vehicle speed lookup table MapV(Dc) defines a relation between the control distance Dc and the target vehicle speed Vtgt. Specifically, as shown in FIG. 2, the target vehicle speed lookup table MapV(Dc) defines the above-described relation such that the target vehicle speed Vtgt becomes smaller as the control distance Dc becomes shorter, and the target vehicle speed Vtgt becomes "0 km/h" when the control distance Dc becomes "Dp".

Step 443: The CPU determines whether or not the vehicle speed Vs is larger than the target vehicle speed Vtgt.

When the vehicle speed Vs is equal to or smaller than the target vehicle speed Vtgt, the process proceeds to step 495 so that the CPU terminates the present routine tentatively.

When the vehicle speed Vs is greater than the target vehicle speed Vtgt, the CPU executes steps 445 and 450.

Step 445: The CPU acquires the target acceleration Gtgt by applying the target vehicle speed Vtgt and the vehicle speed Vs to the above expression (1).

Step 450: The CPU transmits the target acceleration Gtgt to the power management ECU30 and the brake ECU40.

When the power management ECU30 and the brake ECU40 receives the target acceleration Gtgt, the power management ECU30 and the brake ECU40 control the powertrain actuator 32 and the brake actuator 42 so that the acceleration G coincides with the target acceleration Gtgt, respectively.

Thereafter, the process proceeds to step 495 so that the CPU terminates the present routine tentatively.

In a case where the first distance D1 cannot be acquired when the process proceeds to step 425, the CPU determines whether or not the first timer TM1 is equal to or greater than a first threshold TM1th in step 455. The first threshold TM1th is set such that the acquisition time T1 becomes the threshold time T1th when the first timer TM1 becomes the first threshold TM1th.

When the first timer TM1 is equal to or greater than the first threshold TM1th, the CPU executes steps 460 to 470.

Step 460: The CPU acquires the extrapolation distance Dex.

Step 465: The CPU sets the control distance Dc to the extrapolation distance Dex.

Step 470: The CPU determines whether or not the second timer TM2 is equal to or greater than a second threshold TM2th.

When the second timer TM2 is smaller than the second threshold TM2th, the CPU adds "1" to the second timer TM2 in step 475. Thereafter the process proceeds to step 440. On the other hand, when the second timer TM2 is equal to or greater than the second threshold TM2th, the CPU sets the first timer TM1 to "0" in step 480. Thereafter, the process proceeds to step 440. When a time during which the first distance D1 cannot be continuously acquired becomes equal to or longer than the predetermined time, the extrapolation distance Dex is estimated based on the old first distance D1. Therefore, the distance accuracy of the extrapolation distance Dex becomes low. According to the present disclosure, when the time during which the first distance D1 cannot be continuously acquired becomes equal to or longer than the predetermined time, the first timer TM1 is set to "0". As a result, it is possible to prevent the control distance Dc from being set to the extrapolation distance Dex with the low distance accuracy.

In a case where the first timer TM1 is less than the first threshold TM1th when the process proceeds to step 455, the CPU determines whether or not the first approaching state and the second approaching state coincide with each other in step 485.

When the first approaching state and the second approaching state coincide with each other, the CPU sets the control distance Dc to the second distance D2 in step 490. Thereafter, the process proceeds to step 470.

On the other hand, when the first approaching state and the second approaching state do not coincide with each other, the process proceeds to step 460.

As described above, in the above-described embodiment, even when the first distance D1 cannot be acquired, the extrapolation distance Dex is used as the control distance Dc when the acquisition time T1 is equal to or longer than the threshold time T1th. As a result, it is possible to prevent the distance of the object that is not the target object from being continuously used as the control distance Dc.

First Modification

Figure 5:
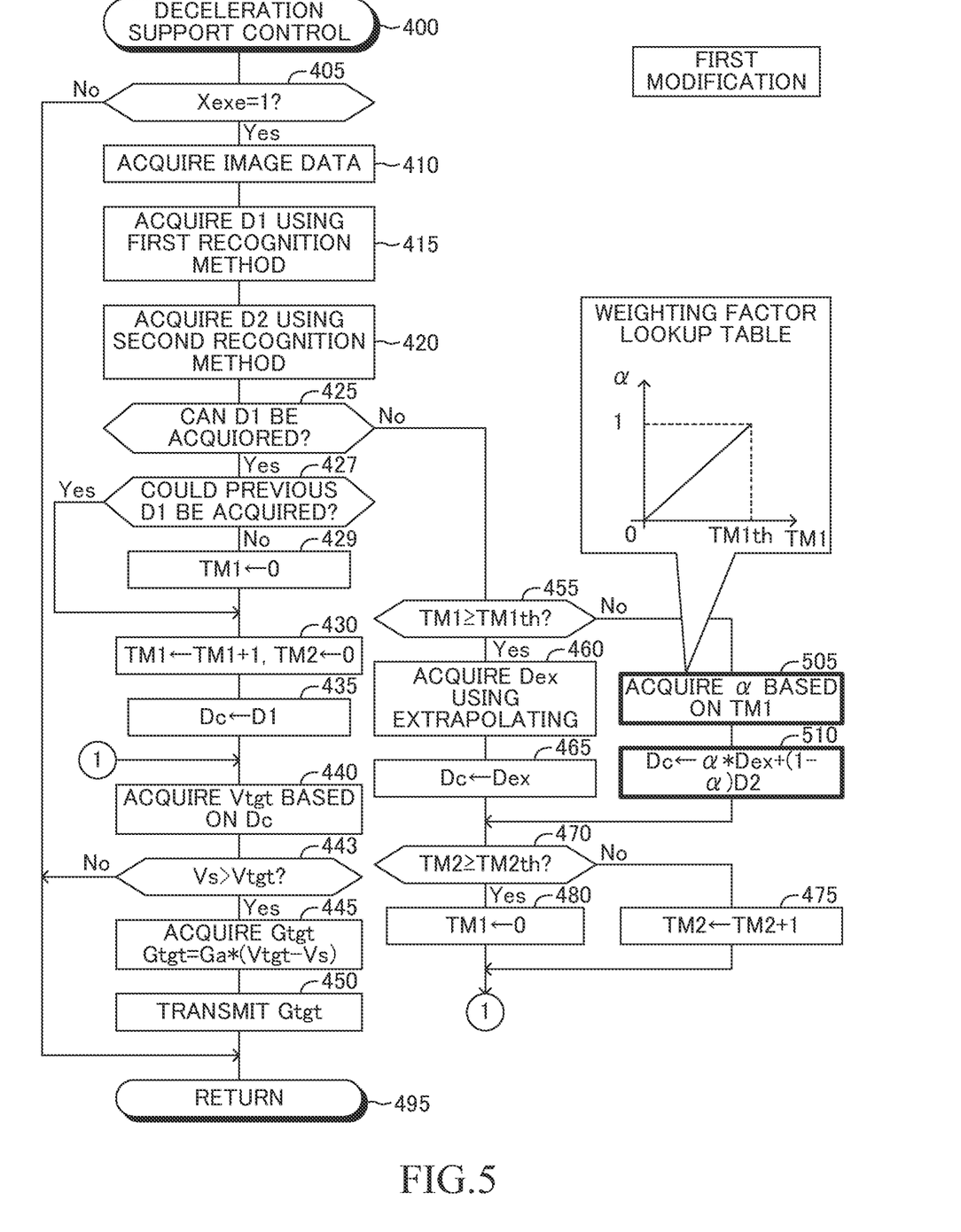
FIG. 5 is a flowchart of a program executed by a CPU of a driving support ECU according to a first modification.

The CPU according to the first modification executes a routine illustrated by a flowchart in FIG. 5 instead of the routine illustrated by the flowchart in FIG. 4. In the routine shown in FIG. 5, the CPU executes steps 505 and 510 instead of steps 485 and 490 of FIG. 4.

When the CPU makes a "No" determination in step 455 of FIG. 5, the CPU executes steps 505 and 510.

Step 505: The CPU acquires a weighting factor α by applying the first timer TM1 to a weighting factor lookup table Map α (TM1).

The weighting factor lookup table Map α (TM1) defines a relation between the weighting factor α and the first timer TM1. Specifically, as shown in FIG. 5, the weighting factor lookup table Map α (TM1) defines the relation such that the weighting factor α increases as the first timer TM1 increases, the weighting factor α becomes "0.0" when the first timer TM1 is "0", and the weighting factor α becomes the weighting factor α "1.0" when the first timer TM1 is the first thresholds TM1th.

Step 510: The CPU acquires a value by applying the extrapolation distance Dex, the second distance D2, and the weighting factor α to the following equation (2) so as to set the control distance Dc to the acquired value.

$$Dc = \alpha * Dex + (1-\alpha) D2. \qquad \text{Equation (2)}$$

According to the equation (2), as the first timer TM1 increases (in other words, as the acquisition time T1 increases), a weight (α) of the extrapolation distance Dex increases, and a weight (1−α) of the second distance D2 decreases. Since the distance accuracy of the extrapolation distance Dex increases as the acquisition time T1 increases, the weight of the extrapolation distance Dex increases and the weight of the second distance D2 decreases.

Second Modification

In the present modification, when the CPU determines that the first distance D1 cannot be acquired in step 425 illustrated in FIG. 5 (step 425 "No"), the CPU may execute steps 505 and 510 without executing step 455. The weighting factor lookup table Map α (TM1) of the present modification defines the relation between the weighting factor α and the first timer TM1 such that the weighting factor α becomes "1.0" when the first timer TM1 is equal to or larger than the first threshold TM1th. When the first timer TM1 is equal to or larger than the first threshold TM1th, the weighting factor α is set to "1.0". Therefore, when the first timer TM1 is equal to or larger than the first threshold TM1th, the control distance Dc is set to the extrapolation distance Dex.

Third Modification

When a non-acquirable state in which the first distance D1 cannot be acquired is changed to an acquirable state in which the first distance D1 can be acquired, the CPU may prohibit from using the first distance D1 as the control distance Dc until a predetermined time elapses from a changing time point at which the non-acquirable state is changed to the acquirable state. In this case, the CPU uses the extrapolation distance Dex as the control distance Dc when the acquisition time T1 is equal to or greater than the threshold time T1$th$. Further, in a case where the acquisition time T1 is less than the threshold time T1$th$, the CPU uses the second distance D2 as the control distance Dc when the first approaching state and the second approaching state coincide with each other, and uses the extrapolation distance Dex as the control distance Dc when the first approaching state and the second approaching state do not coincide. It is also possible to apply the first modification and the second modification to the present modification.

Fourth Modification

The driving support control is not limited to the deceleration support control. For example, the driving support control may be an alert control. In the alert control, when the control distance Dc becomes equal to or shorter than a threshold distance Dcth, the driving support ECU20 causes the display device 52 to display an alert screen for pay the driver's attention to the target object TO. It should be noted that the driving support ECU20 may increase an alert level of the alert screen as the control distance Dc becomes shorter.

Fifth Modification

The target object TO is not limited to a traffic light. For example, the target object TO may be a pause line on a lane on which the vehicle VA is traveling, or may be a preceding vehicle.

Sixth Modification

An area captured by the camera 22 is not limited to the front of the vehicle VA. The camera 22 may capture a front, left, right, and/or rear of the vehicle VA.

Seventh Modification

The support apparatus 10 may include a sensor such as a millimeter wave radar instead of the camera 22.

Eighth Modification

The support apparatus 10 may be applied vehicles such as an engine vehicle, a HEV (Hybrid Electric Vehicle), a PHEV (Plug-in Hybrid Electric Vehicle), a FCEV (Fuel Cell Electric Vehicle), and a BEV (Battery Electric Vehicle).

What is claimed is:

1. A driving support apparatus comprising:
a sensor configured to acquire sensor information that is used to acquire a distance between a vehicle and an object; and
a controller configured to execute a driving support control using a first distance representing a distance between the vehicle and a predetermined target object as a control distance, the first distance being acquired by applying a first recognition method to the sensor information,
wherein, the first recognition method has a characteristic that a recognition reliability of the target object increases as an acquisition time of the first distance increases,
wherein,
the controller is further configured to use an extrapolation distance representing the vehicle and the target object as the control distance, when the first distance can no longer be acquired and the acquisition time is equal to or longer than a predetermined threshold time, the extrapolation distance being estimated based on an acquired distance representing the first distance which was acquired and a speed of the vehicle
wherein,
the controller is further configured to:
recognize the target object and acquire a second distance between the vehicle and the target object, by applying, to the sensor information, a second recognition method of which a distance accuracy is lower than the distance accuracy of the first recognition method; and
in a case where the first distance can no longer be acquired and the acquisition time of the first distance is shorter than the threshold time, use the second distance as the control distance when a first approaching state and a second approaching state coincide with each other,
wherein,
the first approaching state, which is specified based on a traveling direction of the vehicle, represents whether the target object recognized using the second recognition method is approaching to the vehicle or going away from the vehicle,
the second approaching state, which is specified based on the second distance, represents whether the target object recognized using the second recognition method is approaching to the vehicle or going away from the vehicle.

2. The driving support apparatus according to claim 1, wherein,
the controller is further configured to control a traveling state of the vehicle based on the control distance such that the vehicle stops a predetermined distance before the target object.

3. A driving support apparatus comprising:
a sensor configured to acquire sensor information that is used to acquire a distance between a vehicle and an object; and
a controller configured to execute a driving support control using a first distance representing a distance between the vehicle and a predetermined target object as a control distance, the first distance being acquired by applying a first recognition method to the sensor information,
wherein, the first recognition method has a characteristic that a recognition reliability of the target object increases as an acquisition time of the first distance increases,
wherein,
the controller is further configured to use an extrapolation distance representing the vehicle and the target object as the control distance, when the first distance can no longer be acquired and the acquisition time is equal to or longer than a predetermined threshold time, the extrapolation distance being estimated based on an acquired distance representing the first distance which was acquired and a speed of the vehicle,
wherein,
the controller is further configured to:
recognize the target object and acquire a second distance between the vehicle and the target object, by applying, to the sensor information, a second recognition method of which a distance accuracy is lower than the distance accuracy of the first recognition method; and in a case where the first distance can no longer be acquired and the acquisition time of the first distance is shorter than the threshold time, use the extrapolation distance as the control distance when a first approaching state and a second approaching state do not coincide with each other, wherein, the first approaching state, which is specified based on a traveling direction of the vehicle, represents whether the target object recognized using the second recognition method is approaching to the vehicle or going away from the vehicle, the second approaching state, which is specified based on the second distance, represents whether the target object recognized using the second recognition method is approaching to the vehicle or going away from the vehicle.

4. The driving support apparatus according to claim 3, wherein, the controller is further configured to control a traveling state of the vehicle based on the control distance such that the vehicle stops a predetermined distance before the target object.

* * * * *